United States Patent [19]

von Harpe et al.

[11] 4,237,244
[45] Dec. 2, 1980

[54] MOLDING COMPOSITION BASED ON UNSATURATED POLYESTERS

[75] Inventors: Hannes von Harpe; Ludwig Bottenbruch; Bernd Peltzer; Hansjochen Schulz-Walz, all of Krefeld, Fed. Rep. of Germany

[73] Assignee: Bayer Aktiengesellschaft, Leverkusen, Fed. Rep. of Germany

[21] Appl. No.: 751

[22] Filed: Jan. 3, 1979

[30] Foreign Application Priority Data

Jan. 5, 1978 [DE] Fed. Rep. of Germany ....... 2800468
Nov. 28, 1978 [DE] Fed. Rep. of Germany ....... 2851337

[51] Int. Cl.$^3$ .......................... C08F 8/46; C08L 7/00; C08L 23/46; C08L 47/00

[52] U.S. Cl. ......................................... 525/171; 260/3; 525/27; 525/39; 525/168; 525/169; 525/170; 525/439; 525/440; 525/442; 525/446; 525/448

[58] Field of Search .................. 260/873, 862, 871, 3; 525/168, 169, 170, 171, 440

[56] References Cited

U.S. PATENT DOCUMENTS

| | | | |
|---|---|---|---|
| 3,577,478 | 5/1971 | Thrope | 260/873 |
| 3,793,400 | 2/1974 | Curtis, Jr. et al. | 260/862 |

Primary Examiner—J. Ziegler
Attorney, Agent, or Firm—Connolly and Hutz

[57] ABSTRACT

Molding compositions comprising terminally unsaturated polyesters, vinyl or vinylidene compounds copolymerizable therewith and elastomeric polymers have an excellent impact strength and a good heat distortion temperature, strength and rigidity.

6 Claims, No Drawings

MOLDING COMPOSITION BASED ON UNSATURATED POLYESTERS

This invention relates to molding compositions based on "terminally unsaturated" urethane group-free polyesters, vinyl or vinylidene compounds copolymerizable therewith and elastomeric polymers.

Molding compositions of polyesters containing random ethylenically unsaturated structural units, copolymerizable monomers and rubberlike polymers are known (cf. German Auslegeschrifts Nos. 1,166,467 and 1,241,983 and U.S. Pat. Nos. 3,231,631; 3,688,178; 3,882,078; 3,857,812 and 3,674,893).

Although hardened moldings produced from these molding compositions show high dimensional stability, the impact strength thereof is by no means adequate for universal application. In addition, the inadequate compatibility between the rubber-like component and the resin frequently gives rise to problems with regard to the handling properties of the end product as supplied to the consumer which either consists of two components or has to contain additional additives which may be dissolved out when the hardened products come into contact with solvents, thereby reducing the favourable resistance to chemicals of the hardened unsaturated polyester resin compositions.

The present invention relates to hardenable molding compositions comprising (a) from 5 to 77 parts, by weight, of a "terminally unsaturated" urethane group-free polyester,
(b) from 20 to 80 parts, by weight, of a vinyl or vinylidene compound copolymerizable therewith; and
(c) from 3 to 25 parts, by weight, of an elastomeric polymer having a glass transition temperature of from $-90°$ to $+10°$ C., a second phase in the form of particles having an average diameter of from 0.1 to 100 μm being intended to form during hardening.

According to a preferred embodiment of the invention the specific fracture surface energy of the copolymer of (a) and (b) (e.g. without component (c) being formed during hardening is 22 $0.5·10^5$, preferably between $0.5·10^5$ and $10^6$, ergs/cm² (as measured at 25° C. by the method of L. J. Broutman and F. J. McGarry, J. Applied Polym. Sci. 9, 589 et seq (1965)).

The molding compositions according to the present invention are in the form of clear solutions of relatively low viscosity or storable dispersions. When hardened, they give moldings having considerably higher impact strength for substantially the same dimensional stability to heat as compared with conventional compositions based on polyesters containing random unsaturated structural units.

In the context of the present invention, "terminally unsaturated" urethane group-free polyesters are polyesters in which the first dicarboxylic acid residue, counting from the both ends of the linear polymer chain, contains an ethylenically unsaturated double bond, whilst the rest of the molecule does not contain any further copolymerizable ethylenically unsaturated double bonds.

"Terminally unsaturated" urethane group-free polyesters are known (cf. German Auslegeschrift No. 2,052,961). Depending on the composition thereof, they form elastomeric, leather-like or rigid, glass-like transparent products after copolymerization with vinyl or vinylidene compounds. In this case, too, the increase in impact strength is obtained at the expense of reductions in dimensional stability to heat, strength and rigidity.

The polyester (a) and the elastomeric polymer (c) have to satisfy certain requirements if the moldings produced from the molding compositions are to have the required properties:

Before hardening, the molding compositions according to the present invention should form a clear mixture of relatively low viscosity or a storable dispersion and, after hardening, a two-phase system having a glass transition temperature of from $-90°$ to $+10°$ C. for the rubber-like phase and a different glass transition temperature of from $50°$ to $250°$ C. for the resin phase, characterized by the position of the loss modulus maxima of the complex shear modulus in dependence upon temperature at 1 Hz or by electron-microscopically detectable particles having an average diameter of from 0.1 to 100 μm.

The preferred embodiment of the invention according to which the specific fracture surface energy of the copolymer of (a) and (b) is $>0.5·10^5$ and erg/cm² is obtained based on the constitution of (a) and (b) according to simple rules:

An increase of the density of cross-linkage in the a/b-copolymer, an increase of the amount of aromatic and/or cycloaliphatic groups and a decrease of the number of atoms between the terminal double bonds of the polyester (a) cause a reduction of the specific fracture surface energy. With the knowledge of these criteria it is possible to obtain the preferred embodiment without any effort and in a reproducible manner—using the given components, even by only fixing the mixing ratio a/b—if necessary, after conducting a few pre-experiments.

Preferred "terminally unsaturated" urethane group-free polyesters correspond to the following general formula:

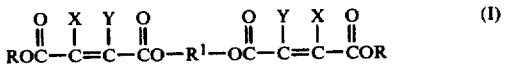

$$\begin{matrix} & O & X & Y & O & & & O & Y & X & O & \\ & \| & | & | & \| & & & \| & | & | & \| & \\ ROC & - & C & = & C & -CO-R^1-OC- & C & = & C & -COR \end{matrix} \quad (I)$$

wherein

R¹ represents the difunctional radical of a polyester reduced by two hydroxyl groups which polyester does not contain any α,β-ethylenically unsaturated groups; and X, Y and R represent hydrogen or $C_1$-$C_6$ alkyl. These "terminally unsaturated" urethane group-free polyesters may be produced by a multistage process, e.g. by reacting 1 mole of one or more organic dicarboxylic acids with from 1.05 to 2.0 moles of one or more organic diols and subsequently reacting 1 mole of the resulting hydroxyl group-containing saturated polyester with an approximately equivalent quantity, preferably from 1.9 to 2.2 moles, of an α,β-ethylenically unsaturated dicarboxylic acid anhydride, the corresponding unsaturated dicarboxylic acid or the semi-ester thereof.

Accordingly, the molding compositions according to the present invention may be obtained by esterifying, in a first stage, 1 mole of an organic dicarboxylic acid or dicarboxylic acid mixture with from 1.05 to 2.0 moles of an organic diol or diol mixture, preferably in the melt at from 150° to 220° C., optionally in the presence of conventional inhibitors, with elimination of water, and, in a second stage reacting 1 mole of the thus-obtained OH-group-containing preliminary product with an approximately equivalent quantity, preferably from 1.9 to 2.2 moles, of at least one α,β-ethylinically unsaturated dicarboxylic acid anhydride, the corresponding unsaturated dicarboxylic acid or its mono-ester in the melt at from about 60° to 140° C., or in the same way as described for the first step and mixing: from 5 to 77 parts, by weight, of the resulting "terminally unsaturated" urethane group-free polyester(a) with from 20 to 80 parts, by weight, of a vinyl or vinylidene compound (b) copolymerizable therewith and from 3 to 25 parts, by weight, of an elastomeric polymer (c) and, optionally, further auxiliaries and additives.

Linear polyesters containing hydroxyl groups which are preferably used for producing "terminally unsaturated" polyesters are polycondensation products of aliphatic, cycloaliphatic and/or aromatic dicarboxylic acids generally containing from 2 to 16 carbon atoms or the ester-forming derivatives thereof with at least one diol generally containing from 2 to 24 carbon atoms. These linear polyesters should generally have an average molecular weight (number average Mn) of from 200 to 3000.

Organic diols preferably used for producing the linear polyesters are, for example, dihydroxy compounds containing from 2 to 24 carbon atoms, such as ethylene glycol, 1,2- and 1,3-propane diol, diethylene glycol, dipropylene glycol,1,2-, 1,3- and 1,4-butane diol, neopentyl glycol, 2-ethyl-1,3-propane diol, 1,6-hexane diol, 2,2-bis-(4-hydroxycyclohexyl)-propane, bis-alkoxylated bisphenyl A and hydroxyl group-containing linear polyesters which are free from copolymerizable carbon-carbon multiple bonds. Preferred dicarboxylic acids are, for example, succinic acid, adipic acid, sebacic acid, phthalic acid, isophthalic and terephthalic acids, hexahydro- or tetrahydro-phthalic acid, endomethylene tetrahydrophthalic acid, tetrachlorophthalic acid or hexachloro-endomethylenetetrahydrophthalic acid.

Compounds preferably used for producing the "terminally unsaturated" urethane group-free polyesters are α,β-ethylenically unsaturated dicarboxylic acid anhydrides and dicarboxylic acids generally containing from 4 to 10 carbon atoms, for example maleic acid anhydride, citraconic acid anhydride, maleic acid, fumaric acid, itaconic acid, mesaconic acid or chloromaleic acid or the mono-esters thereof.

Preferred copolymerizable vinyl and vinylidene compounds suitable for the purposes of the present invention are the unsaturated compounds commonly encountered in polyester technology which preferably contain α-substituted vinyl groups or β-substituted allyl groups, preferably styrene.

However, it is also possible to use, for example, nucleus-chlorinated and -alkylated or -alkenylated styrenes, in which the alkyl and alkenyl groups may contain from 1 to 4 resp. 2 to 4 carbon atoms such as vinyl toluene, divinyl benzene, β-methyl styrene, t-butyl styrenes and chlorostyrenes; vinyl esters of carboxylic acids containing from 2 to 6 carbon atoms, preferably vinyl acetate; vinyl pyridine, vinyl naphthalene, vinyl cyclohexane, acrylic acid and methacrylic acid and/or the esters thereof (preferably vinyl, allyl and methallyl esters) containing from 1 to 4 carbon atoms in the alcohol component, the amides and nitriles thereof, maleic acid anhydride, maleicmono- and di-esters containing from 1 to 4 carbon atoms in the alcohol component, maleicmono- and di-amides or cyclic imides, such as N-methyl maleic imide or N-cyclohexyl maleic imide; allyl compounds, such as allyl benzene, and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

Preferred elastomeric polymers are, for example, those based on natural rubber or synthetic rubbers, for example polymers of conjugated diolefins, such as butadiene, dimethyl butadiene, isoprene and its homologues, or copolymers of conjugated diolefins with polymerizable vinyl and vinylidene compounds, such as styrene, α-methyl styrene, acrylonitrile, methacrylonitrile, acrylates, methacrylates, for example acrylonitrile, butadiene rubbers, acrylate rubbers, chlorinated rubbers, acrylonitrile/butadiene/styrene copolymers (ABS); also polyalkylene oxides, polylactones, such as polycaprolactone, polylactams, such as polycaprolactam; saturated polyesters, polysilicones and polycarbonates providing they are modified in such a way that they have rubber-like properties; but preferably rubber-like ethylene copolymers and rubber-like polyurethanes.

Preferred ethylene copolymers are copolymers of ethylene and vinyl esters of aliphatic saturated monocarboxylic acids containing from 1 to 18 carbon atoms, particularly vinyl acetate and vinyl propionate, having a vinyl ester content of from 10 to 90%, by weight, and a Mooney viscosity of at least 5 Mooney (as measured in accordance with DIN 53 523) and also graft polymers based on these polymers.

Preferred graft monomers are aromatic vinyl and vinylidene compounds, such as vinyl toluene, α-methyl styrene, t-butyl styrene, chlorostyrenes, but preferably unsubstituted styrene itself, vinyl acetate, (meth)acrylic acid, its nitriles and esters of which the alcohol component may contain from 1 to 8 carbon atoms, such as methyl methacrylate or ethyl acrylate,(meth)acrylonitrile, maleic acid anhydride, maleic acid mono- and di-esters containing from 1 to 8 carbon atoms in the alcohol component or isoprene. Mixtures of the above-mentioned compounds may, of course, be used both as graft bases and as graft monomers. Other preferred polymers are products containing vinyl alcohol, which may be obtained by partial hydrolysis of the above-mentioned ethylene/vinyl ester copolymers or the graft polymers and products containing hydroperoxide groups which may be obtained by oxidation of the abovementioned substances. The above-mentioned graft polymers may be obtained by known methods.

Thus, preferred graft polymers of ethylene/vinyl ester copolymers with grafted-on units of an aromatic vinyl compound and (meth)acrylonitrile may be obtained, for example, by the processes described in British Pat. No. 917,499 or in German Offenlegungsschrifts Nos. 1,964,479 and 2,137,780.

The preferred graft polymers of ethylene/vinyl ester copolymers with grafted-on units of a mixture of aromatic vinyl compounds, (meth)acrylonitrile and α-olefins containing from 2 to 18 carbon atoms may be produced by the processes described in German Offenlegungsschrifts Nos. 2,215,588 and 2,305,681.

Vinyl esters preferred for producing the ethylene/vinyl ester copolymer graft base are organic vinyl esters of saturated, optionally halogen (particularly chlorine)-substituted monocarboxylic acids containing from 1 to 18 carbon atoms or aromatic monocarboxylic acids containing from 7 to 11 carbon atoms, of which the following are specifically mentioned: vinyl formate, vinyl acetate, vinyl propionate, vinyl chloropropionate, vinyl butyrate, vinyl isobutyrate, vinyl caproate, vinyl laurate, vinyl myristate, vinyl stearate and vinyl benzoate, preferably vinyl acetate.

The ethylene/vinyl ester copolymers may be produced by known high-pressure or medium-pressure synthesis processes, optionally in solvents, such as t-butanol.

Preferred grafted-on aromatic vinyl compounds include: styrene, nucleus-substituted alkyl styrenes containing from 1 to 5 carbon atoms in the alkyl radical, such as 4-methyl styrene, α-methyl styrene, halogenated styrenes, such as 4-chloro-styrene or mixtures thereof, preferably styrene.

The grafted-on monoolefins may contain from 2 to 18, preferably from 2 to 8, carbon atoms.

The following monoolefins are specifically mentioned: ethylene, propylene, 1-butene, 2-butene, isobutylene, 2-methyl-2-butene, 3-methyl-1-butene, diisobutylene, tri-isobutylene, 1-pentene, 4-methyl-1-pentene, octa-1-decene, and cyclopentene. It is particularly preferred to use propylene, 1-butene, isobutylene or mixtures thereof.

The elastomeric polyurethanes (c) preferably have a linear structure and an average molecular weight of from 10,000 to 1,000,000, preferably from 20,000 to 500,000 (as determined by membrane osmometry). They may be produced in known manner by reacting a compound having at least two hydrogen atoms which are reactive with isocyanate groups, particularly a polyhydroxyl compound having a molecular weight above 600, optionally a compound containing two isocyanate-reactive hydrogen atoms and having a molecular weight below 600, and a polyisocyanate.

Starting components preferred for the production of the elastomeric polymers (c) include: aliphatic, cycloaliphatic, araliphatic, aromatic and heterocyclic polyisocyanates of the type described, for example, by W. Siefken in Justus Liebigs Annalen der Chemie 562, pages 75 to 136, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, also mixtures of these isomers, 1-methyl-2,4-diisocyanatocyclohexane, 1-methyl-2,6-diisocyanatocyclohexane, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate, also mixtures of these isomers, hexahydro-1,3- and/or 1,4-phenylene diisocyanate, perhydro-2,4'- and/or-4,4'-diphenyl methane diisocyanate, 1,3- and 1,4-phenylene diisocyanate, 2,4- and 2,6-tolylene diisocyanate, also mixtures of these isomers, diphenyl methane-2,4'- and/or -4,4'-diisocyanate, 4,4'-diphenyl propane diisocyanate, naphthylene-1,5-diisocyanate, triphenyl methane-4,4',4''-triisocyanate, polyphenyl polymethylene polyisocyanates of the type which may be obtained by condensing aniline with formaldehyde, followed by phosgenation, and which are described, for example, in British Pat. Nos. 874,430 and 848,671, m- and p-isocyanatophenyl sulphonyl isocyanates according to U.S. Pat. No. 3,454,606, prechlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162), diisocyanates of the type described in U.S. Pat. No. 3,492,330, polyisocyanates containing allophanate groups of the type described, for example, in British Pat. No. 994,890, Belgian Pat. No. 761,626 and published Dutch Patent Application No. 7,102,524, polyisocyanates containing isocyanurate groups of the type described, for example, in U.S. Pat. No. 3,001,973, German Pat. Nos. 1,022,789, 1,222,067 and 1,027,394 and in German Offenlegungsschrifts Nos. 1,929,034 and 2,004,048, polyisocyanates containing urethane groups of the type described, for example, in Belgian Pat. No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394 (U.S. Pat. Nos. 3,125,605 and 3,201,372) and in British Pat. No. 889,050, polyisocyanates obtained by telomerization reactions of the type described, for example, in U.S. Pat. No. 3,654,106, polyisocyanates containing ester groups of the type described, for example, in British Pat. Nos. 965,474 and 1,072,956, in U.S. Pat. No. 3,567,763 and in German Pat. No. 1,231,688, also reaction products of the above-mentioned isocyanates with acetals according to German Pat. No. 1,072,385 and polyisocyanates containing polymeric fatty acid residues according to U.S. Pat. No. 3,455,883.

It is also possible to use the isocyanate group-containing distillation residues obtained in the commercial production of isocyanates, optionally in solution in one or more of the aforementioned polyisocyanates. It is also possible to use mixtures of the aforementioned polyisocyanates.

In general, it is particularly preferred to use the commercially readily available polyisocyanates, for example 2,4- and 2,6-tolylene diisocyanate, also mixtures of these isomers ("TDI"), polyphenyl polymethylene polyisocyanates of the type obtained by condensing aniline with formaldehyde, followed by phosgenation ("crude MDI"), and polyisocyanates containing carbodiimide groups, urethane groups, allophanate groups, isocyanurate groups, urea groups or biuret groups ("modified polyisocyanates").

Other preferred starting components are compounds containing at least two isocyanate-reactive hydrogen atoms and generally having a molecular weight of from 600 to 10,000. In addition to compounds containing amino groups, thiol groups or carboxyl groups, compounds of this type are preferably polyhydroxyl compounds, more especially compounds containing from two to eight hydroxyl groups, particularly those containing two hydroxyl groups and having molecular weights of from 800 to 10,000, preferably from 1000 to 6000, for example polyesters, polyethers, polythioethers, polyacetals, polycarbonates, polyamides and polyester amides containing at least two, generally 2 to 8, but preferably two hydroxyl groups, of the type commonly used for the production of non-cellular and cellular polyurethanes.

In addition to polyester amides or polyacetals, suitable polyhydroxyl compounds having a molecular weight above 600 are in particular linear or predominantly linear polyesters and polyethers.

Examples of preferred polyesters containing hydroxyl groups are reaction products of polyhydric, preferably dihydric, and, optionally, trihydric, alcohols with polybasic, preferably dibasic, carboxylic acids. Instead of the free polycarboxylic acids, the corresponding polycarboxylic acid anhydrides or corresponding polycarboxylic acid esters of $C_1$ to $C_6$ alcohols or mixtures thereof may also be used for the production of the polyesters. The polycarboxylic acids may be aliphatic, cycloaliphatic, aromatic and/or heterocyclic, and may optionally be substituted one or more times, for example by halogen atoms, and/or may be unsaturated.

Preferred examples of these polycarboxylic acids and derivatives thereof include: succinic acid, adipic acid, pimelic acid, suberic acid, azelaic acid, sebacic acid, phthalic acid, isophthalic acid, terephthalic acid, trimellitic acid, phthalic acid anhydride tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acidbis-glycol ester. Examples of preferred polyhydric alcohols include: ethylene glycol, 2-ethyl-1,3-propane diol,1,2- and 1,3-propylene glycol, diethylene and dipropylene glycol, 1,4- and 2,3-butylene glycol, 1,5-pentane diol, 1,6-hexanediol, 1,8-octanediol, neopentyl glycol, cyclohexane dimethanol (1,4-bis-hydroxy methyl cyclohexane), 2-methyl-1, 3-propane diol, glycerol, trimethylol propane, 1,2,6-hexane triol, 1,2,4-butane triol, trimethylol ethane, pentaerythritol, methyl glycoside, also diethylene glycol, triethylene glycol, tetraethylene glycol, higher polyethylene glycols polypropylene glycols, dibutylene glycol and higher polybutylene glycols. The polyesters may contain terminal carboxyl groups and include polyesters of lactones, for example ε-caprolactone, or of straight-chain hydroxy carboxylic acids containing at least 5 carbon atoms, for example ω-hydroxy caproic acid.

The polyesters are produced under such conditions that the terminal groups thereof are at least predominantly hydroxyl groups. It is also possible to use polyethers, such as propylene oxide or tetrahydrofuran polymers, or polythioethers, such as condensation products of thiodiglycol on its own or with other diols. These products generally have an average molecular weight of from 600 to 5000, preferably from 1000 to 2500.

The polyethers containing at least two, generally from 2 to 8, preferably two, hydroxyl groups which may be used in accordance with the present invention are also known and are obtained, for example, by the polyaddition of epoxides, such as ethylene oxide, propylene oxide, butylene oxide, tetrahydrofuran, styrene oxide or epichlorohydrin, on their own, for example in the presence of $BF_3$, or by the chemical addition of these epoxides, optionally in admixture or in succession, with starter components containing reactive hydrogen atoms, such as water, ammonia, alcohols, amines, for example methanol, ethanol, ethylene glycol, 1,3- or 1,2-propylene glycol, dihydroxyl diphenyl propane, 1,4- or 2,3-butylene glycol, 1,6-hexane diol, 1,8-octane diol, neopentyl glycol, 1,4-bis-(hydroxymethyl)-cyclohexane, 2-methyl-1,3-propanediol, glycerol, 1,2,6-hexanetriol, 1,2,4-butane triol, trimethylol ethane, pentaerythritol, phenol, resorcinol, isononyl phenol, hydroquinone, 1,2,2-tris-hydroxyphenyl)-ethane, methylamine, ethylene diamine, tetra- or hexa-methylene diamine, diethylene triamine, ethanolamine, di- and triethanolamine, aniline, phenylene diamine, 2,4- and 2,6-diamino toluene and polyphenyl/polymethylene polyamines of the type obtained by condensing aniline with formaldehyde.

In many cases, it is preferred to use polyethers of the type which predominantly contain primary OH groups (up to 90%, by weight, based on all the OH groups present in the polyether). Polyethers modified by vinyl poymers of the type obtained, for example, by the polymerization of styrene and acrylonitrile in the presence of polyethers (U.S. Pat. Nos. 3,383,351; 3,304,273; 3,523,093 and 3,110,695, German Pat. No. 1,152,536) are also suitable.

Among the polythioethers, particular reference is made to the condensation products of thiodiglycol with itself and/or with other glycols, dicaboxylic acids, formaldehyde, amino caboxylic acids or amine alcohols. Depending upon the co-components, these products are polythio mixed ethers, polythioether esters of polythioether ester amides.

Preferred polyacetals are, for example, those compounds which may be obtained from glycols, such as diethylene glycol, triethylene glycol, 4,4'-dioxethoxy diphenyl dimethyl methane and hexane diol by reaction with formaldehyde. Polyacetals suitable for the purposes of the present invention may also be obtained by polymerizing cyclic acetals.

Preferred polycarbonates containing hydroxyl groups are those known compounds obtainable, for example, by reacting diols, such as 1,3-propane diol, 1,4-butane diol and/or 1,6-hexane diol, diethylene glycol, triethylene glycol and tetraethylene glycol, with diaryl carbonates, for example diphenyl carbonate, or with phosgene.

Preferred examples of the polyester amides and polyamides are the predominantly linear condensates obtained from polybasic, saturated and unsaturated carboxylic acids and the anhydrides thereof and polyfunctional saturated and unsaturated amino alcohols, diamines, higher polyamines and mixtures thereof.

Polyhydroxyl compounds already containing urethane or urea groups and optionally modified natural polyols, such as castor oil or carbohydrates such as starch, may also be used. Addition products of alkylene oxides with phenol/formaldehyde resins or even with urea/formaldehyde resins may also be used in accordance with the present invention.

Representatives of these compounds used in accordance with the present invention are described, for example, in High Polymers, Vol, XVI, "Polyurethanes, Chemistry and Technology", by Saunders-Frisch, Interscience Publishers, New York, London, Vol. I, 1962, pages 32 to 42 and pages 44 to 54, and Vol. II, 1964, pages 5-6 and 198-199, and in Junststoff-Handbuch, Vol. VII, Vieweg- Höchtlen, Carl Hanser-Verlag, Munich, 1966, for example on pages 45 to 71.

It is, of course, also possible to use mixtures of the above-mentioned compounds containing at least two isocyanate-reactive hydrogen atoms and having a molecular weight of from 600 to 10,000, for example mixtures of polyethers and polyesters.

Other starting components which may optionally be used in accordance with the present invention for producing the elastomeric polyurethanes are compounds containing at least two isocyanate-reactive hydrogen atoms and having a molecular weight of from 32 to 600. In this case, too, the compounds in question are compounds containing hydroxyl groups and/or amino groups and/or thiol groups and/or carboxyl groups, preferably compounds containing hydroxyl groups and/or amino groups which are used as chain-extenders.

These compounds generally contain from 2 to 8, preferably 2, isocyanate-reactive hydrogen atoms.

In addition to water or simple glycols, glycols containing urea, urethane, carbonamide or ester groups or glycols containing tertiary nitrogen atoms are mentioned as compounds containing at least two isocyanate-reactive hydrogen atoms and having a molecular weight below 600 (chain-extenders). It is also possible to use glycols containing aromatic ring systems, for example, 1,5-napththylene-β-dioxethylether or hydroquinone-β-dioxethyl ether. Diamines, such as o-dichlorobenzidine, 2,5-dichloro-p-phenylene diamine or 3,3'-dichloro-4,4'-diamino-diphenylmethane are also preferred, as are aminoalcohols, such as N-allylethanolamine, amino- or hydroxy-carboxylic acids.

Preferred examples of such compounds include: water, ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, diethylene glycol, triethylene glycol, tetraethylene glycol, higher polyethylene glycols having a molecular weight of up to 600, dipropylene glycol, higher polypropylene glycols having a molecular weight of up to 600, dibutylene glycol, higher polybutylene glycols having a molecular weight of up to 600, 4,4'-dihydroxy diphenyl propane, bishydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -aminophthalic acid, succinic acid, adipic acid, hydrazine, N,N'-dimethyl hydrazine, 4,4'-diaminodiphenyl methane, tolylene diamine, methylene-bis-chloraniline, methylene-bis-anthranilic acid ester, diaminobenzoic acid esters and the isomeric chlorophenylene diamines.

In this case, too, it is possible to use mixtures of different compounds containing at least two isocyanate-reactive hydrogen atoms and having a molecular weight of from 32 to 600.

According to the present invention, it is also possible to use polyhydroxyl compounds containing high molecular weight polyadducts or polycondensates in finely dispersed or dissolved form. Such modified polyhydroxyl compounds are obtained by carrying out polyaddition reactions (for example reactions between polyisocyanates and aminofunctional compounds) or polycondensation reactions (for example between formaldehyde and phenols and/or amines) directly in situ in the above-mentioned compounds containing hydroxyl groups. Such processes are described, for example, in German Auslegeschrifts Nos. 1,168,075 and 1,260,142 and in German Offenlegungsschrifts Nos. 2,324,134; 2,423,984; 2,512,385; 2,513,815; 2,550,796; 2,550,797; 2,550,833 and 2,550,862. However, it is also possible, in accordance with U.S. Pat. No. 3,869,413 and German Offenlegungsschrift No. 2,550,860, to mix an aqueous polymer dispersion with a polyhydroxyl compound and subsequently to remove the water from this mixture.

The rubber-like polyurethane elastomers preferably used in accordance with the present invention may be produced by reacting the polyhydroxyl compounds having a molecular weight above 600 with less than the equivalent quantity of a diisocyanate, based on the terminal groups, adding the compound containing two reactive hydrogen atoms and having a molecular weight below 600 and completing the reaction by the addition of more diisocyanate. However, it is also possible to react the polyhydroxyl compounds with an excess of diisocyanates over and above the quantity required for reaction with the terminal groups and to measure the quantity in which the compound having a molecular weight below 600 is used in such a way that an excess over and above the quantity based on the isocyanate groups still present is obtained. The mixture of the polyhydroxyl compound having a molecular weight above 600 and the compound having a molecular weight below 600 may, of course, also be reacted with an excess of diisocyanates.

The molding compositions according to the present invention may be produced by dispersing the elastomeric polymer in a mixture of the "terminally unsaturated" urethane group-free polyester and the copolymerizable vinyl or vinylidene compound at a temperature of from 20° to 80° C. It is, of course, also possible to disperse the elastomeric polymer in the copolymerizable compound at a temperature of from 20° to 80° C. and to mix the resulting dispersion with the dispersion of the "terminally unsaturated" polyester in the copolymerizable compound.

In order to prevent premature gelation, polymerization inhibitors may be added to the molding compositions according to the present invention in the conventional quantities, e.g. from 0.001 to 0.1%, by weight, based on the sum of components (a), (b) and (c). Examples of preferred polymerization inhibitors include: hydroquinone and alkylated hydroquinones, such as toluhydroquinone, dimethyl hydroquinone, trimethyl hydroquinone or p-t-butyl hydroquinone, p-t-butyl pyrocatechol, p-benzo-quinone, chloranil, naphthoquinone, copper compounds, such as copper naphthenate or copper octoate, addition compounds of Cu(I) halides with phosphites, such as Cu(I)Cl/triphenyl phosphite, Cu(I)Cl/trimethyl phosphite, Cu(I)Cl/tris-chlorethyl phosphite or Cu(I)Cl/tripropyl phosphite, phenols or phenol derivatives, such as 4,4'-bis-(2,6-di-t-butyl-phenol), 1,3,5-trimethyl2,4,6-tris-(3,5-di-t-butyl-4-hydroxy benzyl)-benzene or 4,4'-butylidene-bis-(6-t-butyl-m-cresol), secondary aryl amines, such as phenyl-β-naphthylamine or 4,4'-bis(α,αdimethylbenzyl)-diphenylamine, phenothiazines, p-nitrosodimethyl aniline and other stabilizers of the type described in "Methoden der organischen Chemie" (Houben- Weyl), 4th Edition, Vol. XIV/1, pages 433–452, 756, Georg Thieme-Verlag, Stuttgart, 1961.

Polymerization initiators may be added to the molding compositions according to the present invention before hardening in the conventional quantities, preferably in quantities of from 0.5 to 5%, by weight, based on the sum of components (a), (b) and (c). Examples of preferred polymerization initiators include: diacyl peroxides, such as diacetyl peroxide, dibenzoyl peroxide, di-p-chlorobenzoyl peroxide, t-butyl peroxide, peroxy esters, such as t-butyl peroxy acetate, t-butyl peroxy benzoate, t-butyl peroctoate, dicyclohexyl peroxy dicarbonate or 2,5-dimethyl hexane-2,5-diperoctoate, alkyl peroxides, such as bis-(t-butyl-peroxy butane), dicumyl peroxide, t-butyl cumyl peroxide, hydroperoxides, such as cumene hydroperoxide, t-butyl hydroperoxide, cyclohexanone hydroperoxide, methylethyl ketone hydroperoxide, perketals, acetal acetone peroxide or azoiso-butyrodinitrile.

Fillers and reinforcing materials may be added to the resin compositions produced in accordance with the present invention generally in quantities of up to 300%, by weight, preferably from 50 to 200%, by weight, based on the sum of components (a), (b) and (c). Preferred fillers and reinforcing materials include: inorganic materials such as heavy spar, calcium carbonate, silicates, aluminas, chalk, lime, carbon, asbestos, glass and metals, and organic materials, such as cotton, sisal, jute, polyesters and polyamides, preferably in the form of fibres. Glass fibres in any form, particularly in the form of mats, are preferably used as reinforcing materials.

In order to reduce the polymerization shrinkage which occurs during hardening, it is also possible to add to the compositions known shrinkage-reducing additives, such as thermoplastic polymers, polycondensates or polyaddition compounds.

The oxides and hydroxides of metals belonging to the Second Main Group of the Periodic System (see U. Hofmann, W. Rudorff, Anorganische Chemie, 16th ed., Friedr. Vieweg & Sohn, Braunschweig 1956, Periodic Table page 152) which are known as chemical thickeners, preferably oxides and hydroxides of magnesium may be added to the molding compositions according to the present invention generally in quantities of from 0.1 to 10%, by weight, preferably from 1.0 to 3.0%, by weight, based on the sum of components (a), (b) and (c), as may additives which accelerate or regulate chemical thickening, such as from 0.1 to 0.5%, by weight, of water or additives according to German Offenlegungsschrift No. 1,544,891, for example aliphatic carboxylic acids or partial phosphoric acid esters, or according to German Offenlegungsschrift. No. 1,326,103, for example an organic amide, in effective quantities.

The various components of the molding compositions according to the present invention are best mixed in kneaders, dissolvers or even on roll stands.

In addition, it is, of course, possible, if desired, to add inorganic or organic pigments, dyes, lubricants and release agents, such as zinc stearate, thixotropic agents, and UV-absorbers, in the conventional quantities.

The molding compositions according to the present invention may be hardened either in the absence of pressure or under a pressure of from 3 to 300 kp/cm$^2$ at a temperature of from 70° to 180° C. In addition, hardening may be carried out at from 15° to 25° C. using accelerators, such as amines, particularly aromatic amines, or cobalt salts. Moldings of all types such as containers, bodywork sections and machine covers, may be produced from the molding compositions.

EXAMPLES

In the following percentages are % by weight and parts are parts by weight.

I. Elastomeric polymer

A. A partially hydrolyzed ethylene/vinyl acetate copolymer of:
13.6% of ethylene units
67.7% of vinyl acetate units
18.7% of vinyl alcohol units
(Mooney viscosity ML 4' = 18; solidification temperature as determined by differential thermoanalysis at a heating rate of 20° C./min.:5° C.).

B-F: Polyurethane elastomers

| Poly-ure-thane | Poly-ester | Poly-iso-cyan-ate | Chain exten-der | $\overline{M}n$* | Solid-ifica-tion point** °C. |
|---|---|---|---|---|---|
| B | 1000 g of adipic acid/ethylene glycol polyester having an OH-number of 56 | 87 g of mixture (80:20) of 2,4- and 2,6-diisocyanato-toluene | — | 63,800 | −30 |
| C | 1000 g of adipic acid/1,4-butane diol polyester having an OH-number of 52.4 | 81.2 g of isomer mixture (80:20) of 2,4- and 2,6-diisocyanato-toluene | — | 52,300 | −43 |
| D | 1000 g of adipic acid/1,2-propane diol/ethylene glycol polyester having an OH-number of 56.5; molar diol ratio 2.8 | 206 g of 4,4'-diisocyanato-diphenyl methane | 35.5 g of 1,4-butane diol | 107,000 | −28 |
| E | 1000 g of adipic acid/1,6-hexane diol/neopentyl glycol polyester having an OH-number of 56.2; molar diol ratio 2:1 | 206 g of 4,4'-diisocyanato-diphenyl methane | 33 g of 1,4-butane diol | 76,800 | −34 |
| F | 1000 g of adipic acid/1,4-butane diol polyester having | 163.5 g of 4,4'-diisocyanate diphenyl methane | 16.8 g of 1,4-butane diol | 62,600 | −39 |

-continued
B-F: Polyurethane elastomers

| Poly- ure- thane | Poly- ester | Poly- iso- cyan- ate | Chain exten- der | $\overline{M}n$* | Solid- ifica- tion point** °C. |
|---|---|---|---|---|---|
| | an OH-number of 52.4 | | | | |

*Membrane osmosis using dioxane as solvent,
**Differential thermoanalysis at a heating rate of 20° C./minute.

II. Molding Compositions

EXAMPLE 1

332 g of isophthalic acid are esterified under nitrogen at 180° C. using 318 g of diethylene glycol until the acid number is less than 2. Thereafter, the temperature is reduced to 100° C., followed by the addition of 196 g of maleic acid anhydride and 0.15 g of hydroquinone. The reaction is continued at 100° C. until the difference between the total acid number and the semi-ester acid number is less than 5. A 44%, strength solution of the resulting polyester in styrene is then prepared.

12% of the elastomeric polymer are dissolved or dispersed in this solution at 60° C. while air is passed through.

The resulting solution or dispersion is cast to form plates (20×20 cm) which, following the addition of 3 parts of benzoyl peroxide paste (50%) in dibutyl phthalate are hardened for 3 hours at 75° C., followed by tempering for 15 hours at 90° C. Standard small test bars are cut from the thus-obtained plates for measuring impact strength and softening temperature. The results are shown in Table 1.

TABLE 1

| Elastomeric polymer | Form as supplied | | Hardened Product | |
|---|---|---|---|---|
| | appearance | viscosity (mPa.s) | impact strength (kJ/m²) | softening temperature* (°C.) |
| — | clear | 120 | 15 | 76 |
| A | clear | 6800 | 50 | 76 |
| B | slightly cloudy | 3650 | 49 | 75 |
| C | clear | 3100 | 65 | 74 |
| D | slightly cloudy | 6400 | 71 | 72 |

*Differential thermoanalysis at a heating rate of 20° C./minute.

EXAMPLE 2

332 g of isophthalic acid are esterified under nitrogen at 180° C. using 402 g of dipropylene glycol until the acid number has fallen below 2. Thereafter, the temperature is reduced to 100° C., followed by the addition of 196 g of maleic acid anhydride and 0.15 g of hydroquinone. The reaction is continued at 100° C. until the difference between the total acid number and the semi-ester acid number is less than 5. A 44% strength solution of the unsaturated polyester in styrene is then prepared.

Further processing as in Example 1. The results obtained are set out in Table 2:

TABLE 2

| Elastomeric polymer | Form supplied | | Hardened product | |
|---|---|---|---|---|
| | appearance | viscosity (mPa.s) | impact strength (kJ/m²) | softening temperature (°C.) |
| — | clear | 50 | 11.4 | 77 |
| E | slightly cloudy | 5200 | 71 | 77 |

EXAMPLE 3

332 g of isophthalic acid are esterified under nitrogen at 180° C. using 156 g of neopentyl glycol until the acid number has fallen to below 2. Thereafter, the temperature is reduced to 100° C., followed by the addition of 196 g of maleic acid anhydride and 0.15 g of hydroquinone. The reaction is continued at 100° C. until the difference between the total acid number and the semi-ester acid number is less than 5. A 44% strength solution of the unsaturated polyester in styrene is then prepared.

Further processing as in Example 1. The results are shown in Table 3:

TABLE 3

| Elastomeric polymer | Form supplied | | Hardened product | |
|---|---|---|---|---|
| | appearance | viscosity (mPa.s) | impact strength (kJ/m²) | softening temperature (°C.) |
| — | clear | 100 | 15 | 76 |
| E | clear | 8400 | 64 | 75 |
| F | clear | 6600 | 62 | 76 |

EXAMPLE 4

332 g of isophthalic acid are esterified under nitrogen at 180° C. using 229 g of 2-ethyl-1,3-propane diol and 85 g of diethylene glycol until the acid number has fallen below 2. Thereafter, the temperature is reduced to 100° C., followed by the addition of 196 g of maleic acid anhydride and 0.15 g of hydroquinone. The reaction is continued at 100° C. until the difference between the total acid number and the semi-ester acid number is less than 5. A 44% strength solution of the unsaturated polyester in styrene is then prepared.

Further processing as in Example 1. The results are shown in Table 4:

TABLE 4

| Elastomeric polymer | Form supplied | | Hardened product | |
|---|---|---|---|---|
| | appearance | viscosity (mPa.s) | impact strength (kJ/m²) | softening temperature (°C.) |
| — | clear | 250 | 11.8 | 76 |
| D | clear | 6030 | 55 | 75 |

TABLE 4-continued

| Elastomeric polymer | Form supplied | | Hardened product | |
|---|---|---|---|---|
| | appearance | viscosity (mPa.s) | impact strength (kJ/m$^2$) | softening temperature (°C.) |
| E | clear | 4500 | 55 | 75 |

The copolymers of the terminally unsaturated polyesters and styrene have the following fracture surface energies:

| Example No. | ergs/cm |
|---|---|
| 1 | $4.5 \times 10^5$ |
| 2 | $2.9 \times 10^5$ |
| 3 | $3.5 \times 10^5$ |
| 4 | $2.2 \times 10^5$ |

What is claimed is:

1. Hardenable molding compositions comprising
(a) from 5 to 77 parts, by weight, of a "terminally unsaturated" urethane group-free polyester of the formula

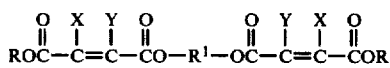

wherein
  $R^1$ represents the difunctional radical reduced by two hydroxyl groups of a polyester which does not contain any $\alpha,\beta$-ethylenically unsaturated groups; and X, Y and R represent hydrogen or $C_1$–$C_6$ alkyl,
(b) from 20 to 80 parts by weight of a vinyl or vinylidene compound copolymerizable therewith; and
(c) from 3 to 25 parts, by weight, of an elastomeric polymer having a glass transition temperature of from 90° to +10° C.,
a second phase in the form of particles having an average diameter of from 0.1 to 100 μm formed during hardening.

2. Molding compositions as claimed in claim 1, characterized in that the copolymer of (a) and (b) being formed during hardening has a specific fracture surface energy of $>0.5 \cdot 10^5$, preferably between $0.5 \cdot 10^5$ and $10^6$, ergs/cm$^2$.

3. A process for the production of molding compositions as claimed in claim 1, characterized in that, in a first stage, 1 mole of one or more organic dicarboxylic acids is esterified using from 1.05 to 2.0 moles of one or more organic diols preferably in the melt at from 150° to 220° C., optionally in the presence of conventional inhibitors, with elimination of water and, in a second stage, 1 mole of the resulting preliminary product containing OH-groups is reacted with an approximately equivalent quantity, preferably from 1.9 to 2.2 moles, of at least one $\alpha,\beta$-ethylenically unsaturated dicarboxylic acid anhydride, the corresponding unsaturated dicarboxylic acid or the mono-ester thereof in the melt at from about 60° to 140° C. or in the same way as described for the first step and from 5 to 77 parts, by weight, of the resulting "terminally unsaturated" urethane group-free polyester (a) are mixed with from 20 to 80 parts, by weight, of a vinyl or vinylidene compound (b) copolymerizable therewith and from 3 to 25 parts, by weight, of an elastomeric polymer (c).

4. A process as claimed in claim 3 in which the first stage is carried out in the melt at 150° to 220° C.

5. A process as claimed in claim 3 in which the second stage is carried out using from 1.9 to 2.2 moles of the anhydride or acid or the mono-ester thereof.

6. A composition when produced by a process as claimed in claim 3.